(12) United States Patent
Kocher

(10) Patent No.: US 9,988,976 B2
(45) Date of Patent: Jun. 5, 2018

(54) TURBOCHARGER

(71) Applicant: Honeywell International Inc., Morristown, NJ (US)

(72) Inventor: Ryan Matthew Kocher, San Pedro, CA (US)

(73) Assignee: Honeywell International Inc., Morris Plains, NJ (US)

( * ) Notice: Subject to any disclaimer, the term of this patent is extended or adjusted under 35 U.S.C. 154(b) by 360 days.

(21) Appl. No.: 14/707,326

(22) Filed: May 8, 2015

(65) Prior Publication Data

US 2015/0337721 A1 Nov. 26, 2015

Related U.S. Application Data

(60) Provisional application No. 62/002,815, filed on May 24, 2014.

(51) Int. Cl.
| | | |
|---|---|---|
| *F02B 39/14* | (2006.01) | |
| *F04D 25/02* | (2006.01) | |
| *F04D 29/063* | (2006.01) | |
| *F02C 7/06* | (2006.01) | |
| *F01D 9/02* | (2006.01) | |

(Continued)

(52) U.S. Cl.
CPC ............ *F02B 39/14* (2013.01); *F01D 9/026* (2013.01); *F01D 25/002* (2013.01); *F01D 25/16* (2013.01); *F01D 25/18* (2013.01); *F01D 25/24* (2013.01); *F02C 7/06* (2013.01); *F04D 25/024* (2013.01); *F04D 29/063* (2013.01); *F16N 31/02* (2013.01); *F05D 2220/36* (2013.01); *F05D 2220/40* (2013.01); *F05D 2230/52* (2013.01); *F05D 2260/39* (2013.01); *F16C 19/184* (2013.01);

(Continued)

(58) Field of Classification Search
CPC .... F16N 31/02; F16N 2031/025; F01D 25/18; F02B 39/14; F16C 33/6685
See application file for complete search history.

(56) References Cited

U.S. PATENT DOCUMENTS 2,709,567 A 5/1955 Wood
3,494,679 A 2/1970 Burdette
(Continued)

FOREIGN PATENT DOCUMENTS

EP 0339601 A1 11/1989
EP 0801217 A1 * 10/1997 ............. F01D 25/16
(Continued)

OTHER PUBLICATIONS

EP Application No. 15167231.8-1603, Search and Examination Report dated Dec. 22, 2015 (7 pages).

*Primary Examiner* — Richard Edgar
*Assistant Examiner* — John S Hunter
(74) *Attorney, Agent, or Firm* — Brian J. Pangrle

(57) ABSTRACT

A turbocharger assembly can include a shaft having a rotational axis where the shaft includes a turbine wheel that includes a hub portion; a bearing that includes an outer race, an inner race operatively coupled to the shaft, and rolling elements disposed between the inner race and the outer race where an inner radius of the outer race and an outer radius of the inner race define a radial gap; and a lubricant slinger disposed axially between the inner race and the hub portion of the turbine wheel where the lubricant slinger includes a surface that faces and slopes away from the radial gap.

11 Claims, 13 Drawing Sheets

(51) Int. Cl.
*F01D 25/00* (2006.01)
*F01D 25/18* (2006.01)
*F01D 25/24* (2006.01)
*F16N 31/02* (2006.01)
*F01D 25/16* (2006.01)
*F16C 19/18* (2006.01)
*F16C 33/66* (2006.01)

(52) U.S. Cl.
CPC ...... *F16C 33/6685* (2013.01); *F16C 2360/24* (2013.01); *F16N 2031/025* (2013.01)

(56) References Cited

U.S. PATENT DOCUMENTS

| | | | |
|---|---|---|---|
| 4,708,602 A | 11/1987 | McEachern, Jr. et al. | |
| 4,789,253 A * | 12/1988 | Perego | F01D 25/164 384/517 |
| 4,943,170 A * | 7/1990 | Aida | F01D 25/164 384/518 |
| 5,870,894 A | 2/1999 | Woollenweber et al. | |
| 6,032,466 A | 3/2000 | Woollenweber et al. | |
| 6,338,614 B1 | 1/2002 | Larue | |
| 2010/0175377 A1* | 7/2010 | Hippen | F02B 37/10 60/602 |
| 2010/0180589 A1 | 7/2010 | Berger et al. | |
| 2015/0330240 A1* | 11/2015 | Kelly | F02B 39/14 415/1 |
| 2016/0160872 A1* | 6/2016 | Kelly | F01D 25/16 415/175 |

FOREIGN PATENT DOCUMENTS

| | | |
|---|---|---|
| GB | 2200696 A | 8/1988 |
| GB | 2248278 A | 4/1992 |
| JP | S63 9430 U | 1/1988 |
| JP | 2010133266 A | 6/2010 |
| JP | 2011111900 A | 6/2011 |
| WO | 8200865 A1 | 3/1982 |

\* cited by examiner

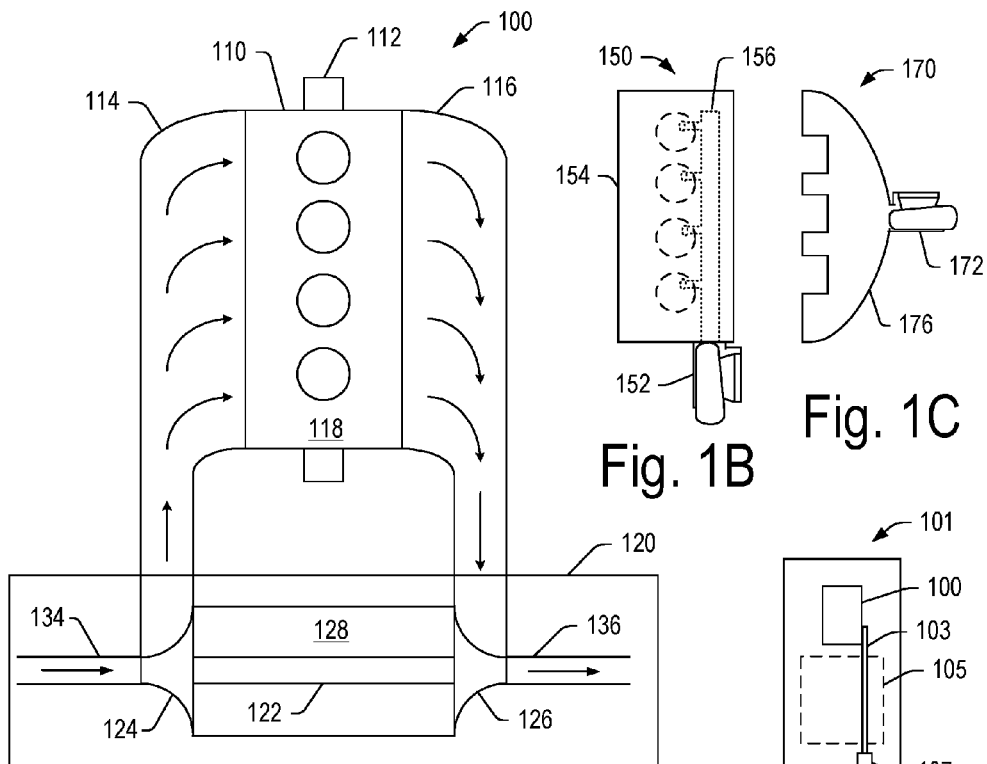
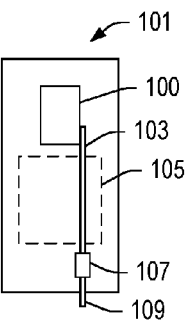
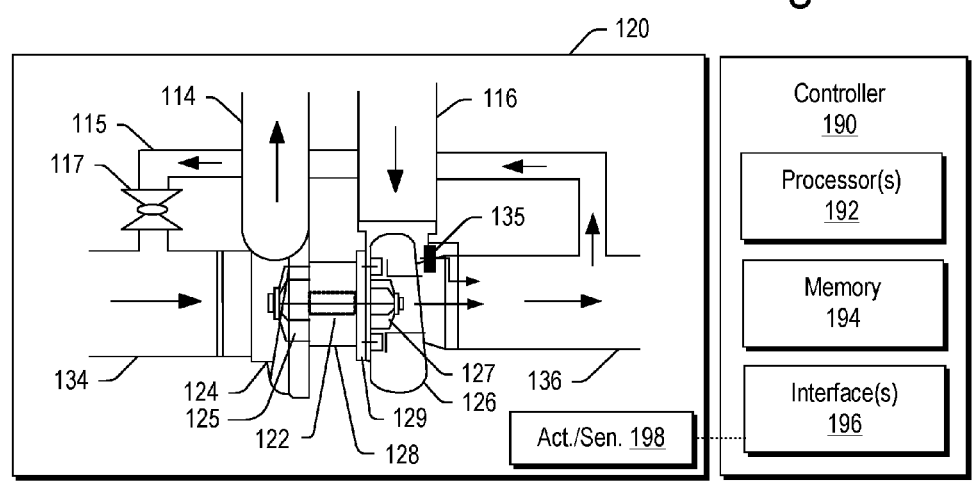

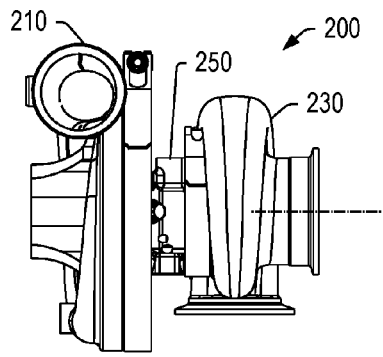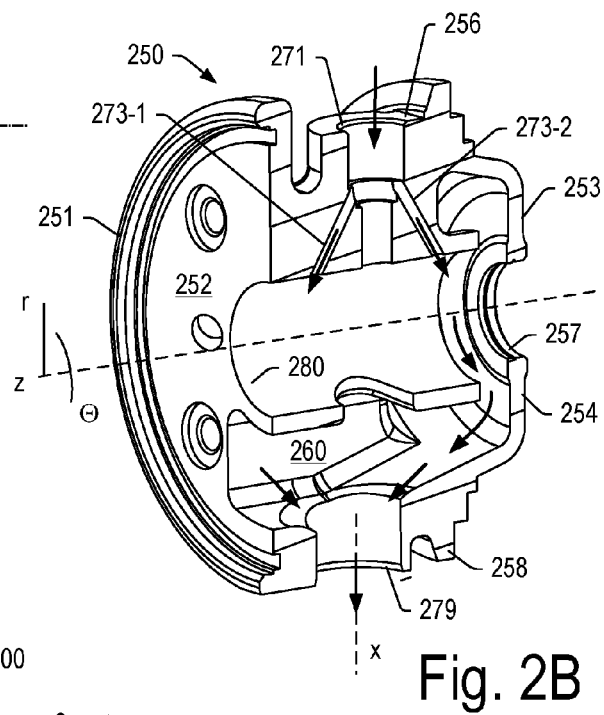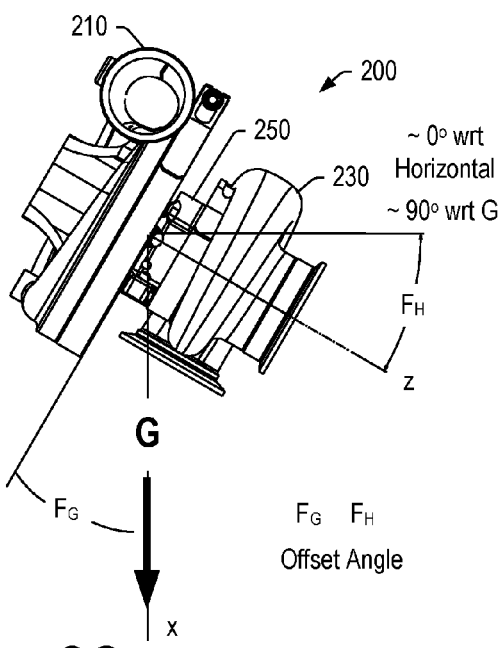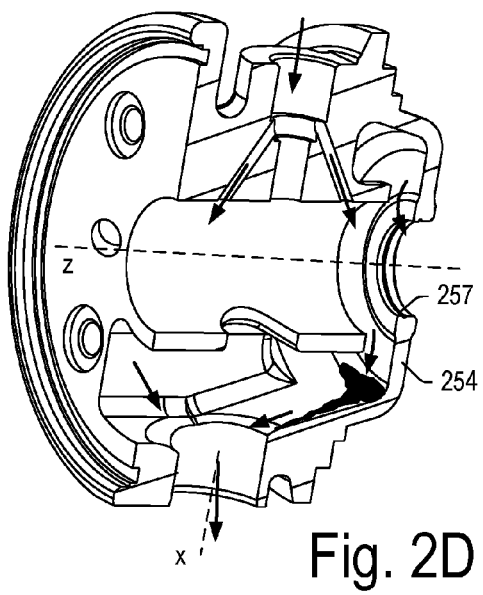
Fig. 2A
Fig. 2B
Fig. 2C
Fig. 2D

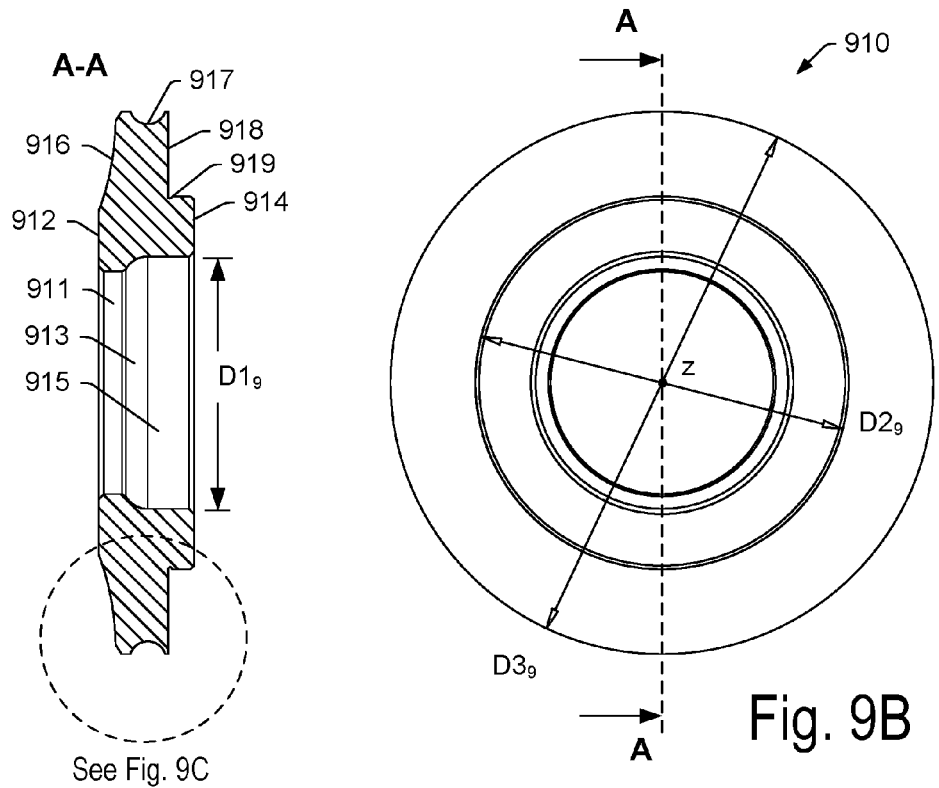
Fig. 9A
Fig. 9B
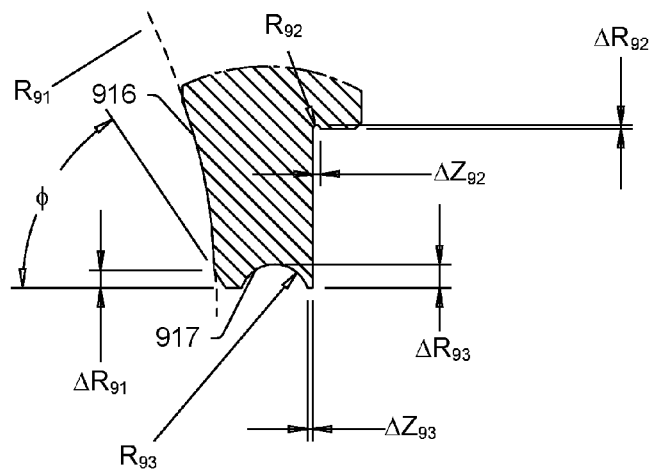
Fig. 9C

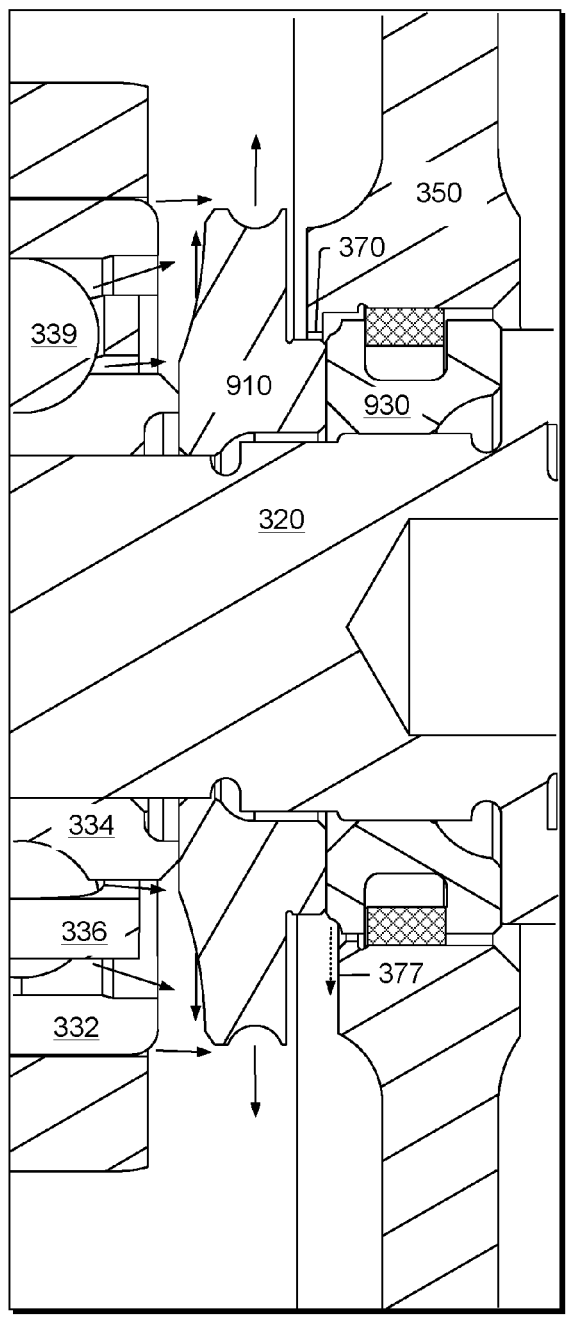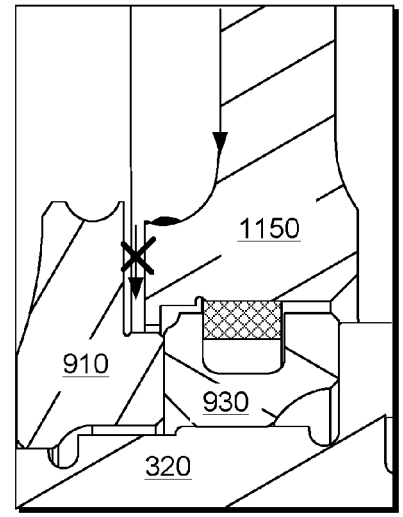
Fig. 12A
Fig. 12B

TURBOCHARGER

RELATED APPLICATIONS

This application claims priority to and the benefit of a U.S. Provisional Application having Ser. No. 62/002,815, filed 24 May 2014, which is incorporated by reference herein.

TECHNICAL FIELD

Subject matter disclosed herein relates generally to turbomachinery for internal combustion engines and, in particular, to turbochargers.

BACKGROUND

Turbochargers are frequently utilized to increase output of an internal combustion engine. A turbocharger can include a shaft rotatably supported by a bearing or bearings. As a turbocharger shaft may be configured to rotate at high rotational speeds, lubricant may be provided to reduce friction via lubricant films and to transfer heat energy. As an example, lubricant may flow in a turbocharger responsive to one or more of pressure differentials, interactions with moving components and gravity. Various examples of techniques, technologies, etc. described herein may be beneficial to, for example, turbocharger performance, internal combustion engine performance, after-treatment performance, etc.

SUMMARY

A turbocharger assembly can include a shaft having a rotational axis where the shaft includes a turbine wheel that includes a hub portion; a bearing that includes an outer race, an inner race operatively coupled to the shaft, and rolling elements disposed between the inner race and the outer race where an inner radius of the outer race and an outer radius of the inner race define a radial gap; and a lubricant slinger disposed axially between the inner race and the hub portion of the turbine wheel where the lubricant slinger includes a surface that faces and slopes away from the radial gap.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 1A, 1B, 1C, 1D and 1E are diagrams of a turbocharger and an internal combustion engine along with a controller;

FIGS. 2A, 2B, 2C and 2D are a series of views of an example of turbocharger that includes a center housing;

FIGS. 9A, 9B and 9C are a series of views of an example of a slinger;

FIGS. 12A and 12B are enlarged cutaway views of FIGS. 11A and 11B with arrows that indicate approximate directions of lubricant flow.

DETAILED DESCRIPTION

Figure 3:
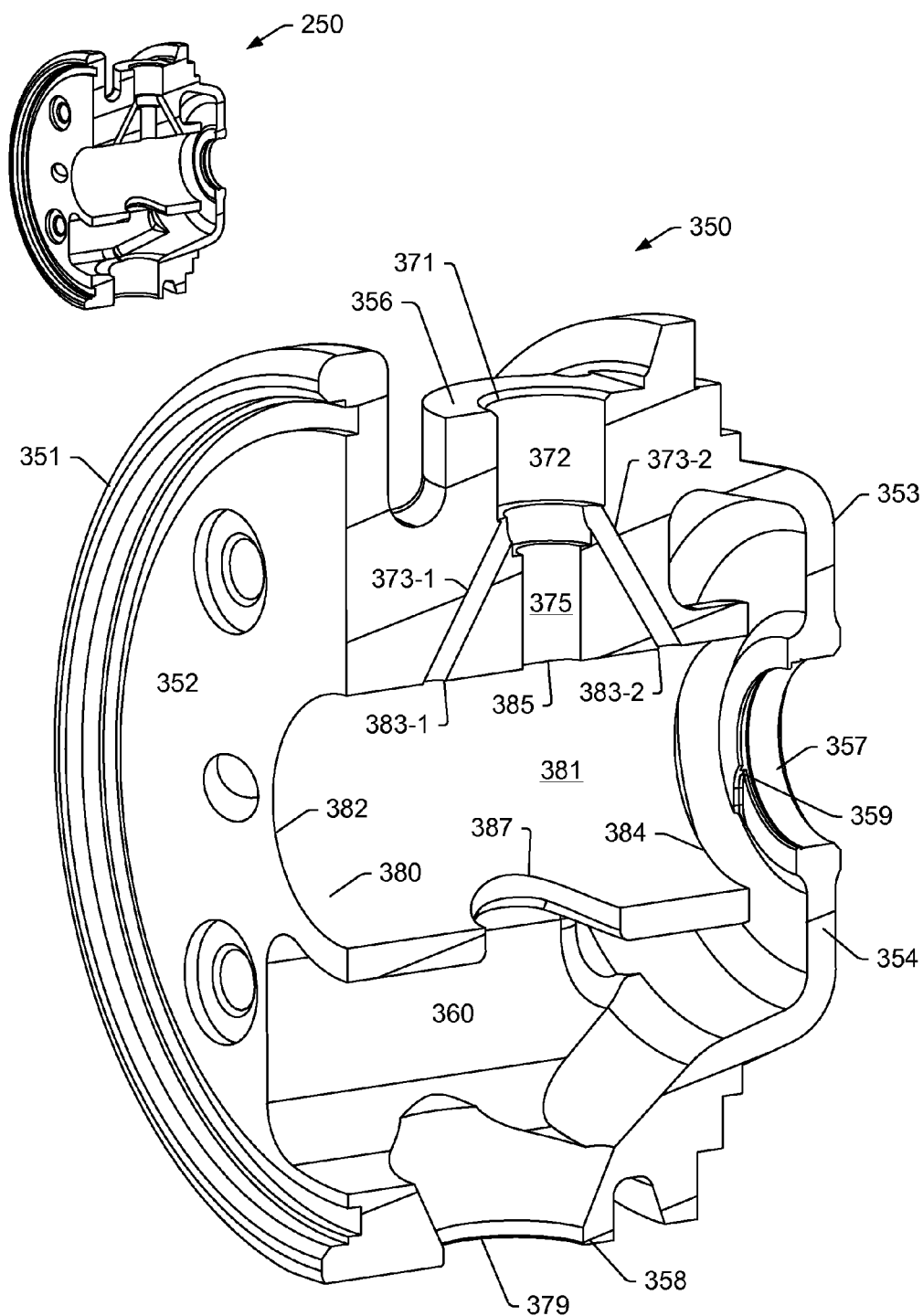
FIG. 3 is a cutaway view of an example of a center housing.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

As an example, a properly installed turbocharger, whether during operation or at rest, should experience little to no lubricant leakage. As to types of leakage that may occur, consider leakage from a compressor seal or a turbine side seal. As an example, excessively high lubricant pressure to a center housing of a turbocharger may increase risk of leakage. As an example, inadequate drainage may increase risk of leakage, for example, where a drain is too small, does not go continuously downhill, or a location of a drain opening that is inside an oil pan is located in a section that has oil slung from an engine crank, which may cause oil to back up in a drain conduit (e.g., drain tube). As an example, improper venting of crankcase pressure may increase risk of leakage. As an example, excessive crankcase pressure may increase risk of leakage.

As an example, excessive pressure across a compressor housing inlet may increase risk of leakage, for example, consider excessive pressure caused by one or more of an air filter being too small, charge air tubing too small or with too many bends between the air filter and compressor housing, and a clogged air filter.

As an example, risk of leakage as to a turbine seal may be increased due to one or more of a collapsed turbine piston ring (e.g., due to excessive exhaust gas temperatures (EGTs), a turbocharger being tilted back on its axis past a recommended angle (e.g., consider a recommended angle of about 15 degrees with respect to horizontal, which may be considered an offset of about 15 degrees with respect to gravity).

As an example, a turbocharger may be oriented with respect to gravity. For example, a turbocharger may include a center housing with a top side, a bottom side and a through bore that may be represented as a cylinder with a central axis (e.g., a rotational axis for a shaft disposed in the through bore and supported therein by one or more bearings). In such an example, the central axis of the through bore may be oriented horizontally with the top side of the center housing facing upward and the bottom side of the center housing facing downward. Where lubricant is provided to the center housing, the lubricant may flow under the influence of gravity in a downward direction. For example, the bottom side of the center housing may include a lubricant drain through which lubricant is intended to exit the center housing. Where the central axis of the through bore of the center housing is disposed at an angle with respect to gravity (e.g., not horizontal), gravity may cause lubricant to flow less rapidly to the lubricant drain of the bottom side of the center housing or gravity may cause lubricant to pool, for example, in a region that does not provide surfaces that slope downward to the lubricant drain due to orientation with respect to gravity. For example, a surface that has a downward slope toward a lubricant drain may, upon tilting of a center housing, become oriented such that lubricant will not flow along the slope toward the lubricant drain under the influence of gravity.

As an example, an engine, engine compartment, engine components, etc. may be arranged such that turbocharger orientations are limited. As an example, a turbocharger may find use in applications where equipment may experience inclination angles that may be beyond a recommended tilt angle.

As an example, consider a vehicle where components are arranged in an engine compartment that prohibits mounting of a turbocharger horizontally with a tilt angle of about 0 degrees. More particularly, consider the turbocharger being "optimally" fit into the engine compartment at an angle of about 45 degrees from horizontal, with the turbine end down. In such an example, lubricant may leak under the influence of gravity from a center housing to a turbine housing. During operation, heat energy may then cause the lubricant to generate smoke (e.g., as it is heated by exhaust).

As an example, a turbocharger may include one or more features that can reduce turbine side leakage from a center housing to a turbine housing. For example, consider a slinger and seal insert assembly that can be positioned on a turbine shaft and combined with an interior seal bore and center housing features to reduce risk of lubricant entering a turbine seal cavity during operation. As another example, consider a center housing drain that has a region extending therefrom that is sloped, for example, to match a desired mounting angle of a turbocharger (e.g., to reduce gravity driven flow of lubricant towards a turbine seal bore).

As an example, a turbocharger can include one or more features that provide for an increase in mount angle with little to no impact on risk of lubricant leakage (e.g., via a turbine seal). As mentioned, a feature may be a slinger. For example, consider an arched slinger configured to throw lubricant purposefully into a center housing lubricant cavity. In such an example, the slinger may include a secondary slinger on an outside diameter for additional lubricant control. As another example of a feature consider a notch in a bottom lip of a seal bore interior to drain lubricant that may get axially past the slinger (e.g., toward a turbine). As an example, consider a labyrinth cavity that may be created behind a slinger via use of seal components that cooperate with respect to a shaft and one or more center housing seal bore features.

As an example, a slinger may function as a "disassembly support" to a ball bearing cartridge, for example, such that risk of damage of a bearing cartridge and its internal components is reduced during disassembly.

As an example, a turbocharger may include a piston ring groove insert that can position a piston ring (e.g., as a seal element) between a slinger and a surface of a shaft and wheel assembly. In such an example, the piston ring groove insert may be a bushing that has one or more inner diameters and an annular groove defined by one or more outer diameters. As an example, a slinger, a bushing and a piston ring (e.g., or other seal element) may be positioned in a manner to facilitate evacuation of a labyrinth cavity.

As an example, a slinger and/or a bushing may be manufactured using machining and/or grinding techniques. As an example, a center housing may be manufactured in part using casting and/or machining and/or welding. As an example, a turbocharger may be characterized at least in part by an installation angle, which may be referred to as a tilt angle or inclination angle with respect to gravity (e.g., or with respect to horizontal; see, e.g., FIG. 2).

As an example, a turbocharger can include a slinger with shaped circumference where the slinger is disposed between a bearing cartridge seated in a through bore of a center housing and a turbine end bore of the center housing. As an example, the slinger may be installed via a compressor end bore of a center housing. As an example, a bushing may be installed via a turbine end bore of a center housing and disposed between a face of a shaft and wheel assembly (SWA) and a face of a slinger (e.g., between an axial face of a hub portion of an SWA). As an example, a turbocharger may include a labyrinth arrangement that includes a lip at a top side (e.g., spanning an arc angle) and a drainage area with no lip at a bottom side (e.g., to form an overhang and to form an undercut). In such an example, a slinger may be disposed on a shaft where the slinger includes an outer diameter that exceeds an inner diameter of a bore formed at least in part by the lip. As an example, a slinger may be sized sufficient to, during disassembly, assure that its outer radius will be held by a center housing and that its inner radius can act to force an inner race of a bearing cartridge (e.g., a rolling element cartridge) off of a shaft (e.g., of a shaft and turbine wheel assembly). As an example, a bushing may include one or more slinger features (e.g., that act to sling lubricant at least radially outwardly).

FIG. 2 shows an example of a turbocharger 200 that includes a compressor housing 210, a turbine housing 230 and a center housing 250. FIG. 2 also shows an arrow that represents a direction of gravity (G), for example, to describe how the turbocharger 200 may be oriented with respect to gravity. As shown, the turbocharger 200 may be oriented relatively horizontally with respect to gravity (e.g., angle of about 0 degrees with respect to horizontal or 90 degrees with respect to gravity) or may be oriented at an angle with respect to gravity (e.g., a non-zero angle with respect to horizontal or a non-90 degree angle with respect to gravity). As shown in FIG. 2, an angle may be an offset angle, which may be offset from horizontal ($\Phi_H$) or offset from a direction of gravity ($\Phi_G$).

In a cutaway view, the center housing 250 is shown as including a compressor side 251, a turbine side 253, a compressor side wall 252, a turbine side wall 254, an upper lubricant inlet boss 256, a lower lubricant outlet boss 258 and a turbine side bore 257 that is formed in the turbine side wall 254. Also shown are a lubricant cavity 260 that is defined by various surfaces, a lubricant inlet opening 271, lubricant passages 273-1 and 273-2, a lubricant outlet opening 279 and a through bore 280.

As shown, lubricant may flow in the center housing 250 via various paths from the lubricant inlet opening 271 to the lubricant outlet opening 279 (e.g., a lubricant drain). Where the center housing 250 is tilted to a non-horizontal angle, lubricant may flow differently in the lubricant cavity 260. For example, lubricant may flow over an edge of the turbine side bore 257 and axially outwardly from the center housing 250. As another example, lubricant may pool and/or flow less rapidly under the influence of gravity from one or more portions of the cavity 260 to the lubricant outlet opening 279. Such behavior may act to increase residence time of lubricant, which may alter heat transfer and/or expose lubricant to increased time-temperature regimes. As an example, risk of coking may increase, which, in turn, may increase risk of build-up, plugging, etc.

FIG. 3 shows an example of a center housing 350, with a smaller insert that shows the center housing 250 for purposes of comparison. In the cutaway view, the center housing 350 is shown as including a compressor side 351, a turbine side 353, a compressor side wall 352, a turbine side wall 354, an upper lubricant inlet boss 356, a lower lubricant outlet boss 358, a turbine side bore 357 that is formed in the turbine side wall 354 and an edge 359 that forms a lip portion (e.g., an overhang) that may be defined by an axial length and an arc angle about a central axis of the bore 357. Also shown are a lubricant cavity 360 that is defined by various surfaces, a lubricant inlet opening 371, a lubricant bore 372, lubricant passages 373-1 and 373-2, a locating pin bore 375 (e.g., for receipt of a locating pin to at least axially locate an outer race of a bearing cartridge), a lubricant outlet opening 379 and a through bore 380 where the locating pin bore 375 includes an opening to the through bore 380.

As shown in the example of FIG. 3, the through bore 380 includes a bore surface 381, a compressor side opening 382, lubricant openings 383-1 and 383-2, an intermediate opening 384 disposed an axial distance from the compressor side opening 382 and an axial distance from the turbine side bore 357, and a lubricant drainage opening 387. The through bore 380 can be defined in part by a central axis, which is a longitudinal axis that extends from the compressor side opening 382 to the intermediate opening 384 and to the bore 357 in the turbine side wall 354.

In the example of FIG. 3, the lubricant outlet opening 379 as formed in the lubricant outlet boss 358, which may also serve as a mount (e.g., a flange, etc.), may be considered as including features that may be described via one or more horizontal cross-sections. For example, such cross-sections may show the cavity 360 as being of increasing cross-sectional area in a direction approaching the central axis of the through bore 380. In particular, the center housing 350 may be defined in part by one or more profiles that may be defined with respect to various dimensions. For example, in a cylindrical coordinate system, r, z and theta coordinates may be used to define surfaces of the cavity 360 and, for example, such surfaces may be analyzed with respect to fluid flow that may be influenced at least in part by gravity. Such an analysis may be performed using one or more numerical techniques (e.g., a finite element method, a finite difference technique, etc.).

In comparing the center housings 250 and 350, they differ in shape of their respective cavities 260 and 360, particularly with respect to their respective lubricant outlet openings 279 and 379. They also differ with respect to their turbine side walls 254 and 354, particularly about the bore 257 and 357. In the example of FIG. 3, a lip exists about the bore 357 that can act to direct lubricant downward in a manner that may reduce risk of lubricant passing into the bore 357 (e.g., where the tilt angle of the center housing 350 is between about 0 degrees and about 50 degrees, with the turbine side down). In such an example, the tilt angle may be an offset angle from horizontal or an offset angle from a direction of gravity.

Figure 4:
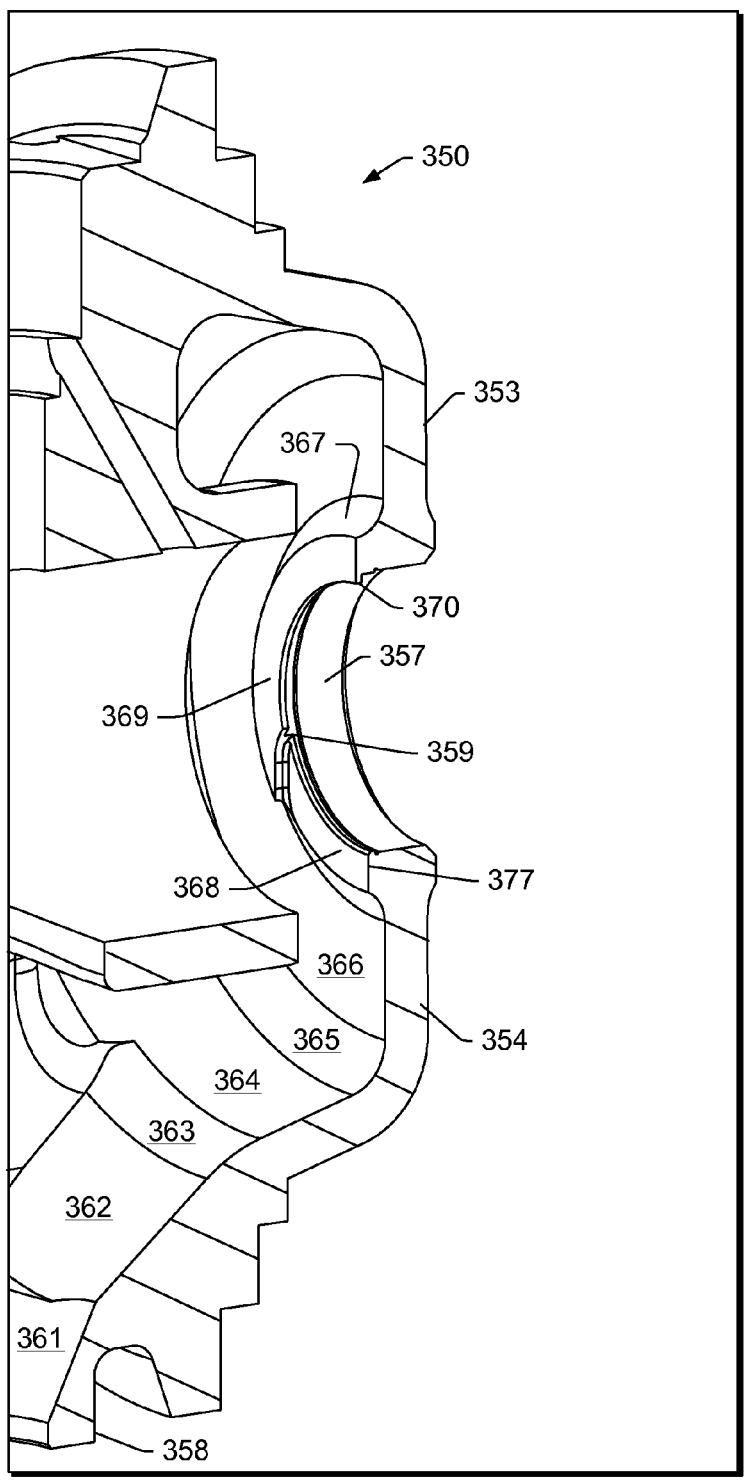
FIG. 4 is an enlarged cutaway view of the center housing of FIG. 3.

FIG. 4 shows an enlarged cutaway view of the center housing 350. As shown, the cavity 360 is defined in part by surfaces 361, 362, 363, 364, 365, 366, 367, 368 and 369. As an example, the surfaces 365 to 369 may be considered to be cast surfaces of the turbine side wall 354, which may be relatively annular in shape with axially inwardly curving outer edges that join the top portion, the bottom portion and side portions of the center housing 350.

As shown, the wall 354 includes the surface 366, which may be considered to be an annular shaped surface with an axial position. Located axially inwardly from the surface 366 are the surfaces 367, 368 and 369. The surface 367 is an annular surface that slopes radially inwardly to an edge at the surface 368 and to an edge at the surface 369. As shown, the edge 359 defines in part the surface 368 and the surface 369. The surfaces 368 and 369 may be defined by arc angles, which may sum to approximately 360 degrees (e.g., of a "whole" housing, noting that the cutaway view of FIG. 4 illustrates a portion of approximately "half" a housing). As mentioned, the surface 369 may be considered a lip surface that overhangs the surface 368, for example, to form an overhang 370 and, for example, the surface 368 may define in part an undercut 377 (e.g., a portion of a bore wall that is in an axial dimension axially less than another portion of the bore wall). Various surfaces are explained with respect to lubricant flow, for example, with reference to FIG. 13, which refers to an upper portion as to the bore 357 and a lower portion as to the bore 357 (e.g., as may be seen in the cutaway view of FIG. 4). The arc angles of the surface 368 and/or the surface 369 (e.g., to form the overhang 370 and/or the undercut 377) may be selected at least in part based on a desired tilt or installation angle for the center housing 350.

Figure 5A:
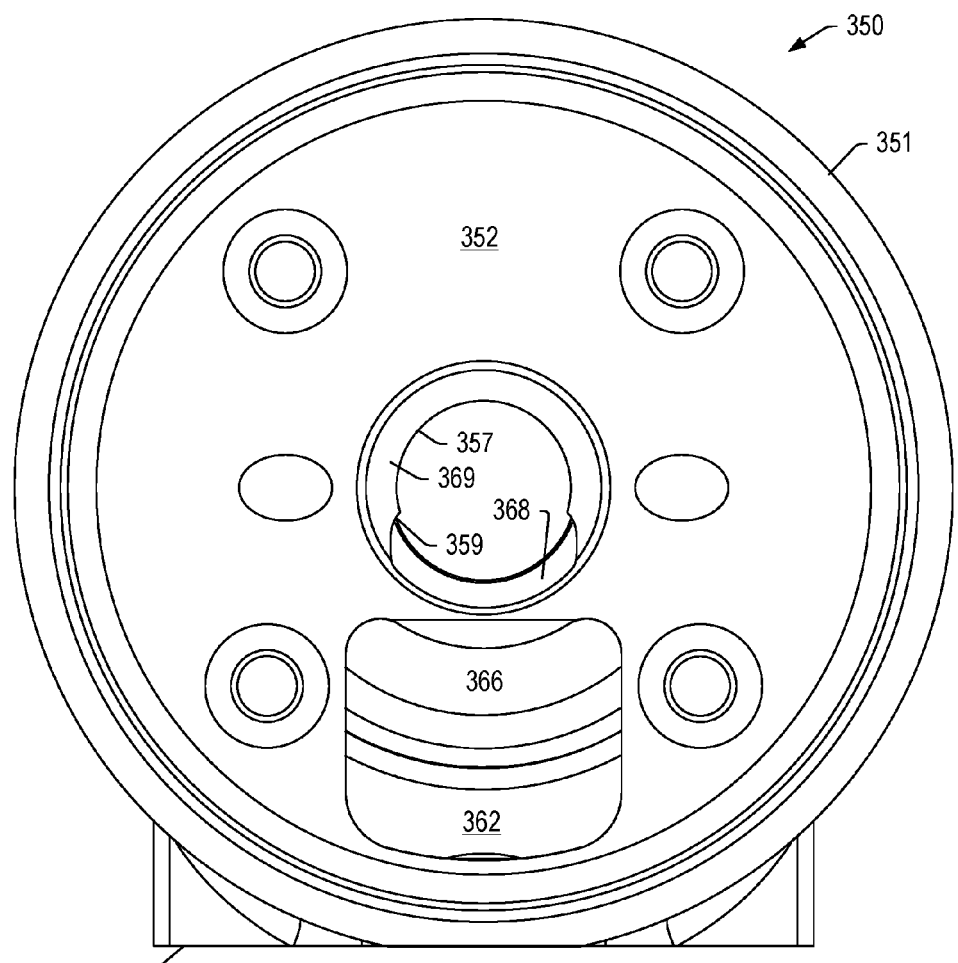
FIGS. 5A, 5B and 5C are is a front end views of the center housing of FIG. 3.
Figure 5B:
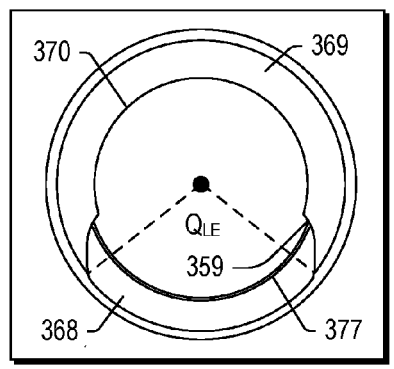
Figure 5C:
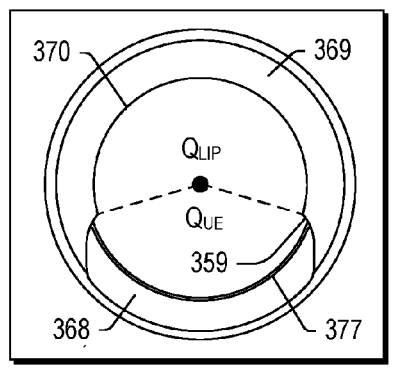

FIG. 5 shows a front end view of the center housing 350, which shows the surfaces 362, 366, 368 and 369 as well as the bore 357 and the edge 359. FIG. 5 also shows various arc angles that may define one or more surfaces, features, etc. of the center housing 350. For example, various arc angles may define in part the overhang 370 and may define in part the undercut 377.

As an example, a turbocharger assembly can include the housing 350, which includes a bearing bore (e.g., as part of the through bore 380 that includes the surface 381) that can receive at least one rolling element bearing; and a turbine side bore 357 (e.g., as a portion of the through bore 380) that extends from an interior of the housing 350 to an exterior of the housing 350 (e.g., from an interior surface to an exterior surface) and where the turbine side bore 357 includes an interior side overhang 370. In such an example, the overhang 370 can include an arc angle less than about 360 degrees, an axial dimension and a radial dimension. As an example, the arc angle may be greater than about 180 degrees (e.g., in a range between about 180 degrees and about 350 degrees).

As an example, a turbocharger assembly can include the housing 350, which includes a bearing bore surface 381 as defining a portion of the through bore 380 that can receive at least one rolling element bearing; and a turbine side bore 357 (e.g., as a portion of the through bore 380) that extends from an interior of the housing 350 to an exterior of the housing 350 (e.g., from an interior surface to an exterior surface) and where the turbine side bore 357 includes an interior side undercut 377. In such an example, the undercut 377 can include an arc angle of less than about 180 degrees. For example, consider an arc angle in a range from about 10 degrees to about 180 degrees. As an example, an undercut may be defined by a depth (e.g., an axial depth) with respect to another surface, which may be, for example, a surface associated with an overhang (e.g., consider the overhang 370).

Figure 6:
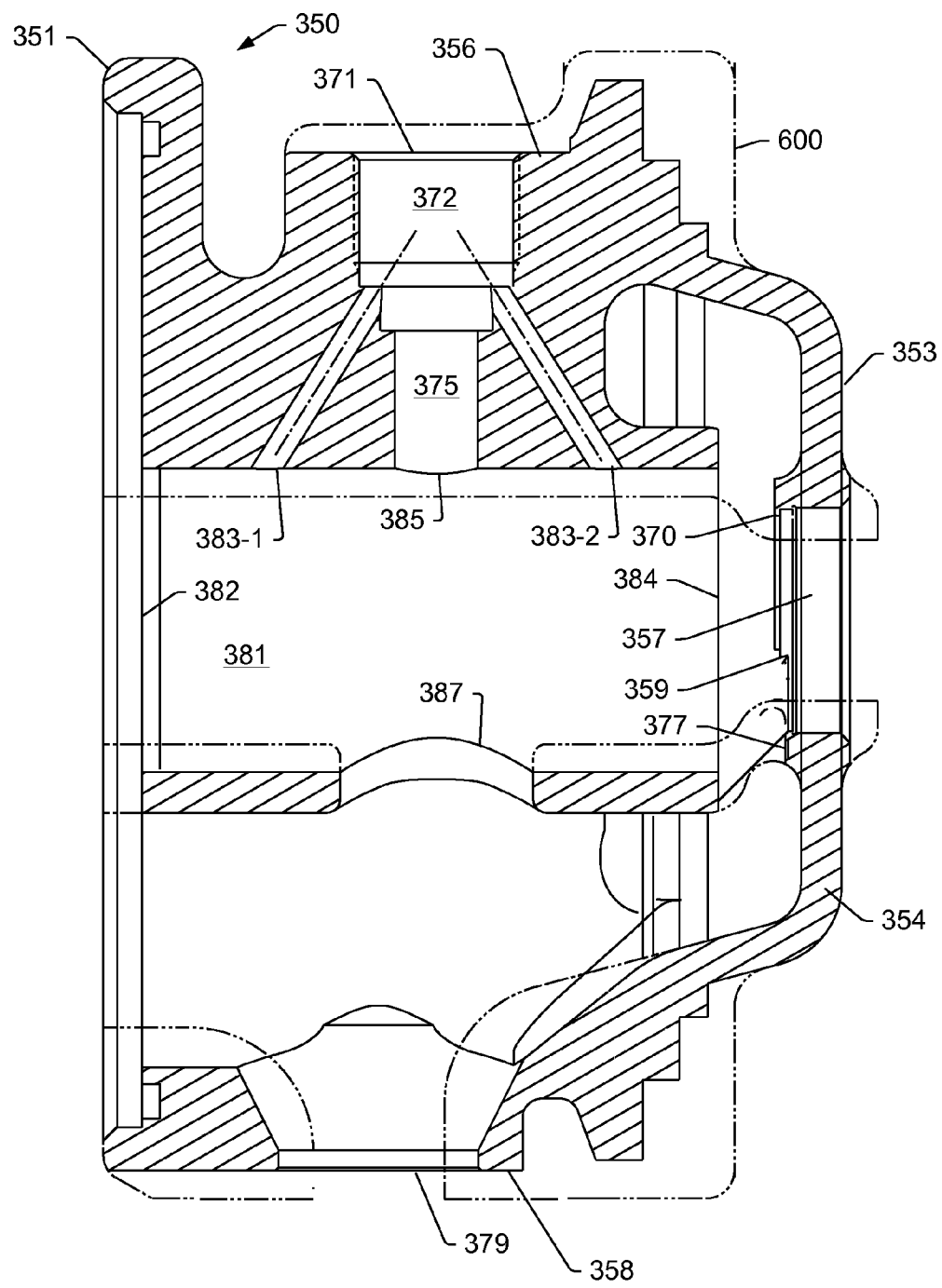
FIG. 6 is a cross-sectional view of the center housing of FIG. 3.

FIG. 6 shows a cross-sectional view of the center housing 350. In FIG. 6, lines labeled generally 600 indicate a cast housing, for example, prior to machining (e.g., finish machining of bores, cavities, etc.). As an example, a housing may be made of a metal, an alloy, etc. For example, a center housing may be made of titanium. As an example, a housing may be made via casting of one or more pieces that are joined via a process such as a welding process.

Figure 7:
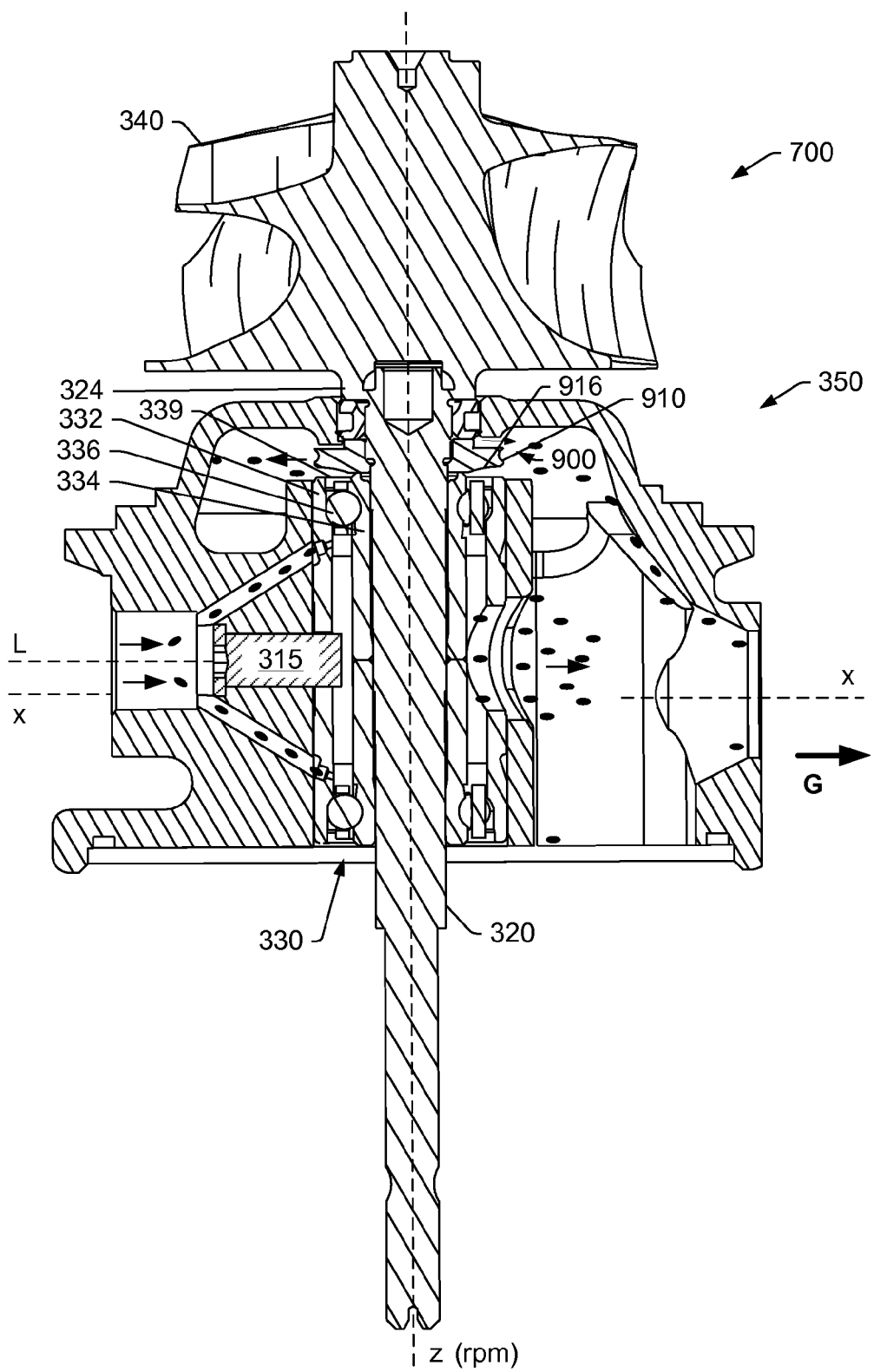
FIG. 7 is a cutaway view of an example of an assembly that includes the center housing of FIG. 3.

FIG. 7 shows a cutaway view of an example of an assembly 700 that includes the center housing 350. As shown, the assembly 700 includes a shaft 320, a bearing cartridge 330, a turbine wheel 340 and a sub-assembly 900 (e.g., a turbine bore sub-assembly). In FIG. 7, a locating pin 315 is at least partially received by the locating pin bore 375 where an end of the locating pin 315 extends into the through bore 380 of the center housing 350 and is received at least in part by an opening of an outer race of the bearing cartridge 330. In such an example, the locating pin 315, as positioned, can act to axially locate the bearing cartridge 330 in the through bore 380 and, for example, limit rotation (e.g., azimuthal movement) of the outer race of the bearing cartridge 330 (e.g., to some specified tolerance) and also allow for radial movement of the bearing cartridge 330 in the through bore 380, for example, to provide for functioning of one or more lubricant films (e.g., squeeze films), which may act to reduce vibration, etc. FIG. 7 also shows various solid-filled ovals that approximate flow of lubricant given the indicated direction of gravity (G). During operation, the sub-assembly 900 as mounted on the shaft 320 may rotate in a manner that acts to direct lubricant at least in part radially outwardly to, for example, diminish flow of lubricant axially toward the turbine wheel 340 (e.g., to diminish flow of lubricant through one or more clearances within the turbine side bore 357).

Figure 8:
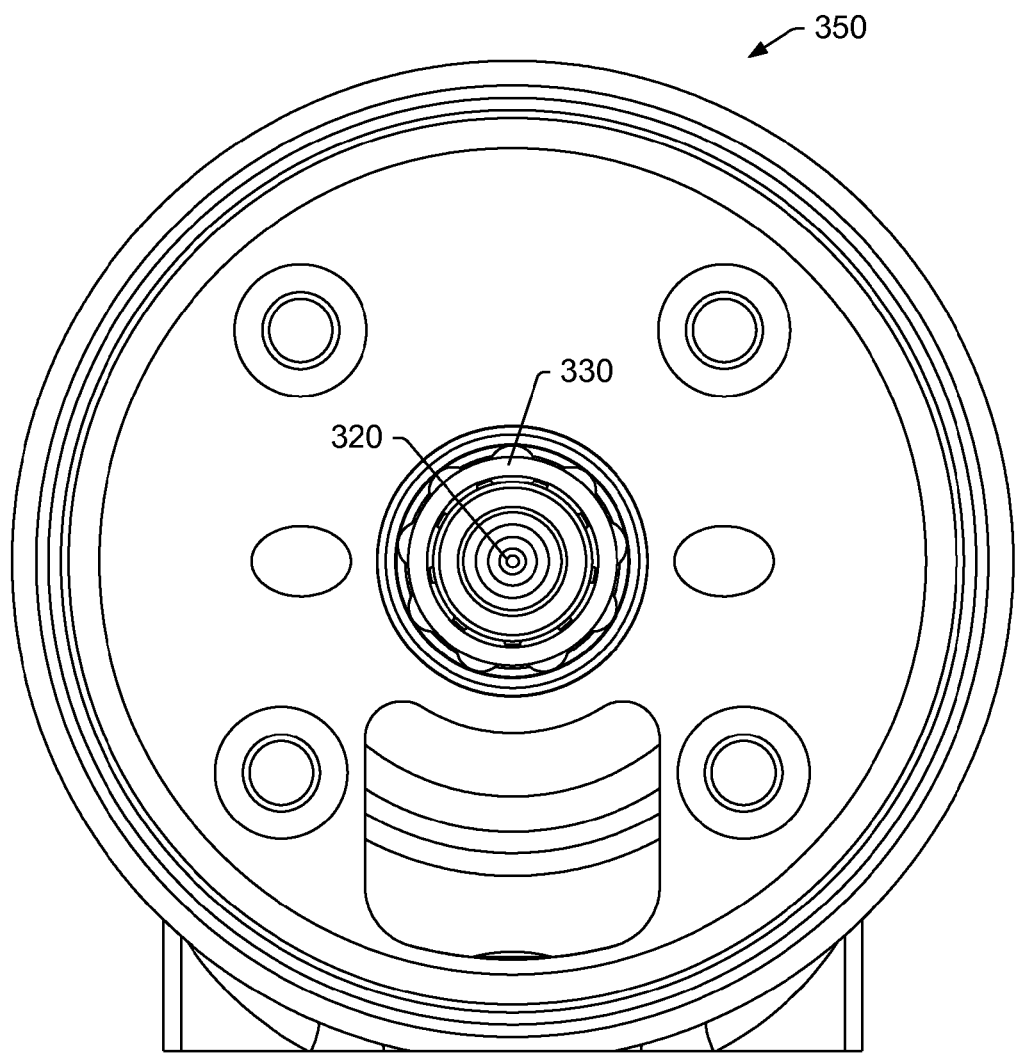
FIG. 8 is a front end view of the assembly of FIG. 7.
Figure 10A:
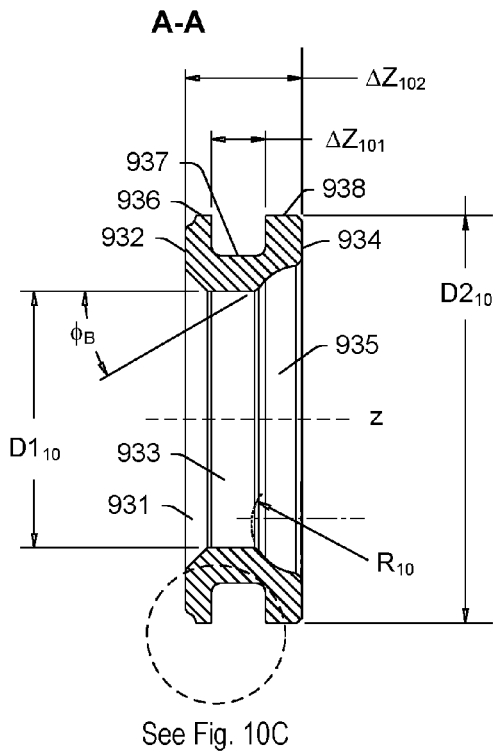
FIGS. 10A, 10B, 10C and 10D are a series of views of an example of a bushing.
Figure 10B:
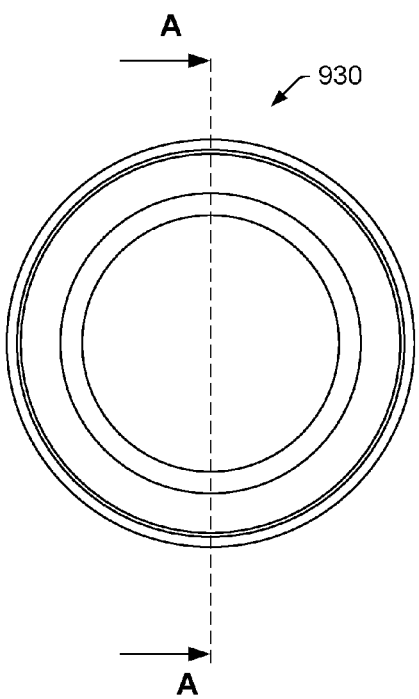
Figure 10D:
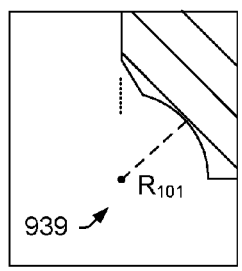
Figure 10C:
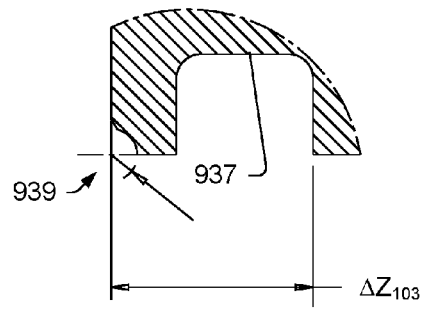

FIG. 8 shows a front end view of the assembly 700 of FIG. 7. In the view of FIG. 8, the bearing 330 and shaft 320 are shown as being at least in part received by the center housing 350. Further, various surfaces are shown via an opening in the compressor side of the center housing 350.

As an example, the assembly 700 can include the shaft 320 having a rotational axis where the shaft 320 includes turbine wheel 340 and where the turbine wheel 340 includes a hub portion 324. In such an example, the bearing 330 can include an outer race 332, an inner race 334 operatively coupled to the shaft 320, and rolling elements 336 disposed between the inner race 334 and the outer race 332 where an inner radius of the outer race 332 and an outer radius of the inner race 334 define a radial gap 339. In such an example, a lubricant slinger 910 can be disposed axially between the inner race 334 and the hub portion 324 of the turbine wheel 340 where the lubricant slinger 910 includes a surface 916 that faces and slopes away from the radial gap 339.

As an example, a rolling element bearing may include a component that acts to space one or more rolling elements. For example, consider a ring or ball separator that includes openings where individual balls are received by respective individual openings. In such an example, the ring or ball separator may rotate, which may be at a rotational speed that differs from that of an inner race and/or an outer race of the rolling element bearing.

In the example assembly 700 of FIG. 7, the lubricant slinger 910 can include an outer diameter or outer radius (e.g., maximum outer diameter or maximum outer radius) that allows for insertion via a compressor side of the center housing 350 (e.g., the diameter or radius of the lubricant slinger 910 being less than an inner diameter or inner radius of the surface 381 of the through bore 380).

FIG. 9 shows a series of views of an example of the lubricant slinger 910 that may be part of the sub-assembly 900. As shown in a cross-sectional view along a line A-A, the slinger 910 includes a series of bores 911, 913 and 915 of increasing diameter, a front face 912, a back face 914, the surface 916, an annular groove 917 with a curved cross-section, and a back side shoulder formed by surfaces 918 and 919. Various dimensions are also indicated in FIG. 9 such as, for example, diameters $D1_9$, $D2_9$ and $D3_9$, which are of increasing dimension. In FIG. 9, various dimensions are indicated as R ($R_{91}$, $R_{92}$, $R_{93}$), which may indicate a radius, $\Delta R$ ($\Delta R_{91}$, $\Delta R_{92}$, $\Delta R_{93}$), which may indicate a radial distance, and $\Delta Z$ ($\Delta Z_{92}$, $\Delta Z_{93}$), which may indicate an axial distance.

As an example, a slinger may include a through bore that may be stepped such that it includes at least one shoulder, which may be a curved shoulder. For example, consider a step from the bore 911 to the bore 915 where the bore 913 is a curved shoulder of increasing radius with respect to increasing axial dimension in a direction from the bore 911 to the bore 915. Such a shoulder may be configured to seat a surface of a shaft, which may be a curved surface. As an example, a slinger may be fit to a shaft via an interference fit. As an example, such an interference fit may be of lesser fitting force than between a shaft and an inner race of a bearing cartridge.

During operation of a turbocharger that includes a turbine-side slinger such as the slinger 910, rotation of a shaft and wheel assembly may cause rotation of the slinger. With respect to the slinger 910, consider lubricant being directed at least in part axially toward the surface 916. During operation, where such lubricant contacts the surface 916 (e.g., or a lubricant film carried thereon), the rotational motion of the slinger 910 will direct the lubricant at least in part radially outwardly. The surface 916 may be considered akin to a reverse banked curve that readily slings lubricant that comes in contact with the surface 916 (e.g., directly or indirectly) radially outwardly therefrom.

As an example, a slinger may include a flat surface. In such an example, lubricant that comes in contact with the flat surface (e.g., directly or indirectly) may progress along the surface radially outwardly until reaching the end of the flat surface at which point it may be slung radially outwardly away from the flat surface of the slinger. While such motion of lubricant may occur with a curved surface (e.g., consider the surface 916), a curved surface has an axial dimension (e.g., a $\Delta z$) from which lubricant may be slung prior to reaching radial end of the curved surface. As an example, a slinger may include one or more flat surfaces and/or one or more curved surfaces that face a bearing cartridge, for example, to sling lubricant that is ejected at least in part axially outwardly from the bearing cartridge.

FIG. 10 shows a series of views of an example of a bushing 930 that may be part of the sub-assembly 900. As shown in a cross-sectional view along a line A-A, the bushing 930 includes a series of bores 931, 933 and 935 of increasing diameter, a front face 932, a back face 934, an outer surface 936 and an outer surface 938 with a recessed annular surface 937 disposed axially therebetween to form a seat for one or more seal elements (e.g., a piston ring, etc.). Various dimensions are also indicated in FIG. 10 such as, for example, diameters $D1_{10}$ and $D2_{10}$, which are of increasing dimension. In FIG. 10, various dimensions are indicated as R ($R_{10}$, $R_{101}$), which may indicate a radius, and $\Delta Z$ ($\Delta Z_{101}$, $\Delta Z_{102}$, $\Delta Z_{103}$), which may indicate an axial distance.

As an example, a bushing may include a through bore that may be stepped such that it includes at least one shoulder, which may be a curved shoulder. For example, consider a step formed by the bore 935, which is a curved shoulder of increasing radius with respect to increasing axial dimension in a direction from the bore 933 to the back face 934. Such a shoulder may be configured to seat a surface of a shaft, which may be a curved surface. As an example, a bushing may be fit to a shaft via an interference fit. As an example, such an interference fit may be of greater fitting force than between a shaft and a slinger such as the slinger 910.

In the example of FIG. 10, the bushing 930 includes a slinger feature 939. Such a feature may act to sling lubricant radially outwardly to diminish flow of lubricant axially (e.g., axially inwardly toward the seal element). As an example, the feature 939 may be configured to extend axially past the surface 368 of the turbine side wall 354 of the center housing 350. In such a manner, rotation of the bushing 930 may sling lubricant radially outwardly via the undercut portion of the bore opening (e.g., along the surface 368 versus the surface 369). For example, a center housing may include a turbine side bore with an overhang portion (e.g., the overhang 370) and an undercut portion where a bushing includes a slinger feature that can direct lubricant radially outwardly away from the bushing via the undercut portion of the turbine side bore. Such an arrangement may act to diminish an amount of lubricant flow axially inwardly toward, for example, a seal element (e.g., as seated in a seat of the bushing). Such an arrangement may act to improve efficacy of a labyrinth seal, particularly where a rotational axis of a turbocharger may be oriented at a non-horizontal angle with a turbine side down (e.g., with respect to gravity).

As an example, a slinger feature of a bushing may be a curved surface. For example, the slinger feature 939 of the bushing 930 may be defined at least in part by a radius that may be at or near an edge of the bushing 930 (e.g., machined into an edge). As an example, a conical or other shaped annular chamfer portion may be at an inner radius that joins a radius of a curved surface (see, e.g., the feature 939 as including a conical portion that extends over an axial dimension and a radial dimension and that joins the radiused portion of the feature 939).

As an example, the lubricant slinger 910 may rotate at the same speed as a shaft of a turbocharger assembly. As an example, a lubricant slinger 910 may contact a shaft over an axial distance that is less than an axial length of the lubricant slinger 910. In such an example, the axial distance being less than the axial length may act to reduce heat transfer from the shaft to the lubricant slinger 910.

As an example, a lubricant slinger may be constructed of a metal, an alloy, etc. For example, consider a lubricant slinger constructed from steel. As an example, a component that may sit adjacent to a lubricant slinger may be constructed from a metal, an alloy, etc. For example, the component 930 may be constructed from an alloy such as an INCONEL™. As an example, a seal element may be a piston ring that contacts a component such as the component 930. In such an example, the seal element may be seated at least in part in a groove of the component 930.

Figures 11A, 11B:
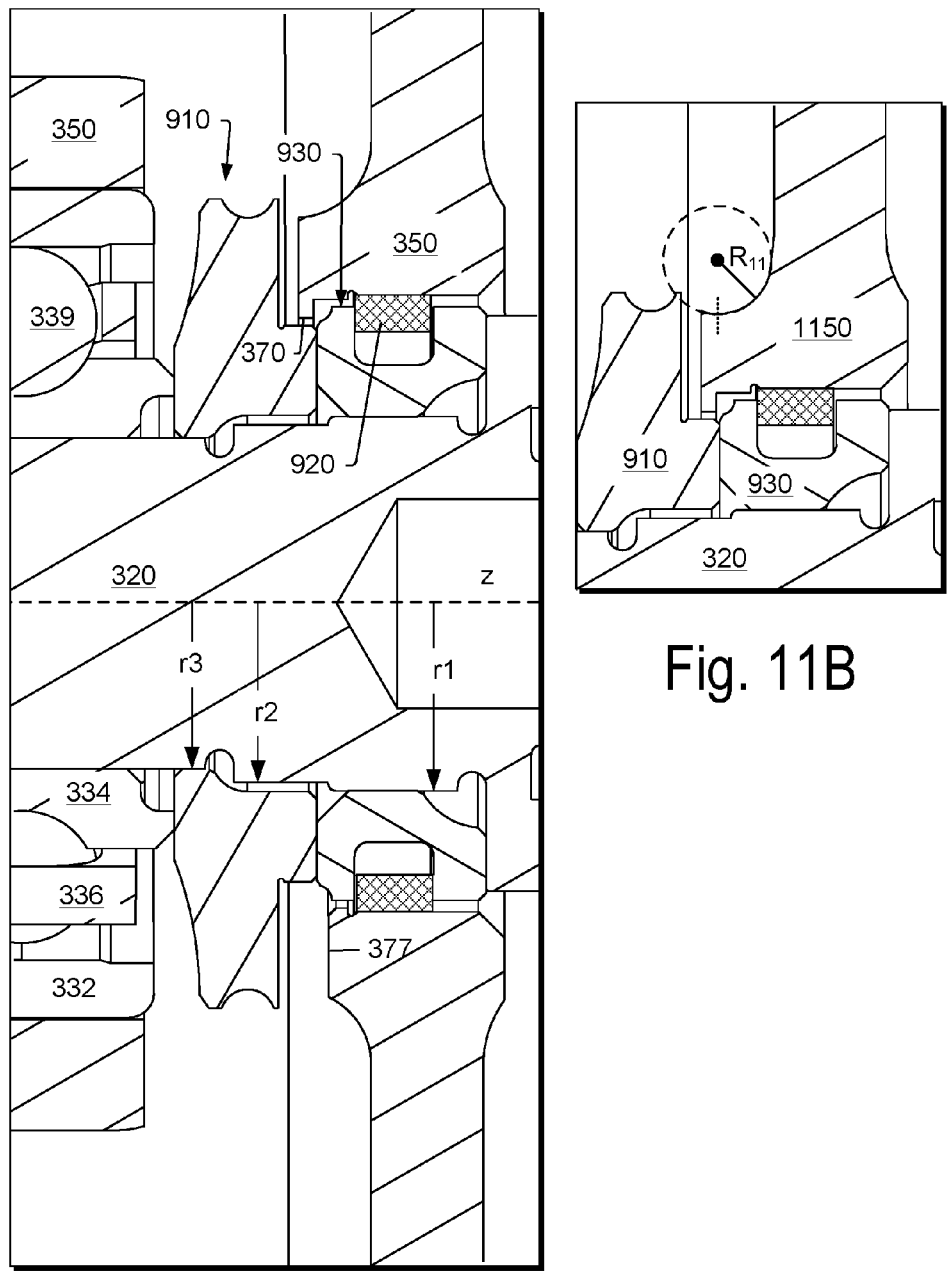
FIGS. 11A and 11B are a series of enlarged cutaway views of a portion of the assembly of FIG. 7 and an example of another boss profile of a portion of a center housing.

FIG. 11 shows a series of enlarged cutaway views of a portion of the assembly 700 of FIG. 7 and an example of another boss profile of a portion of a center housing 1150. In FIG. 11, various dimensions (see, e.g., r1, r2 and r3) are shown with respect to a portion of the shaft 320 with respect to the sub-assembly 900, particularly the slinger 910 and the bushing 930. Also labeled in FIG. 11 are various components of the bearing cartridge 330, which can include an outer race 332, an inner race 334 and a retainer 336, for example, to retain ball bearings 339.

As shown in FIG. 11, the inner race 334 may extend axially to contact the front face 912 of the slinger 910. As an example, upon application of force in a direction axially to the right, the shaft 320 may be removed from the bearing cartridge 330 while the bearing cartridge 330 is retained in the through bore 380 of the center housing 350. For example, the slinger 910 may move axially to the right and bind against the surface 369 of the turbine side wall 354 of the center housing 350, which, in turn, may help to protect the inner race 334 and/or other components of the bearing cartridge 330 during a disassembly process. In such an example, the bushing 930 of the sub-assembly 900 may be removed along with the shaft 320. As to an assembly process, the slinger 910 may be positioned about the shaft 320, for example, after the shaft 320 has been inserted into the center housing 350 via the bore 357. Thereafter, the bearing cartridge 330 may be fit to the shaft 320; noting that other examples of assembly are possible.

Referring to FIG. 5, the surface 369 may cover a sufficient arc angle ($\Theta_{LIP}$) and be of a sufficient annular width (e.g., $\Delta r$ between an inner edge and an outer edge) to provide for supporting the slinger 910. For example, where the arc angle ($\Theta_{LIP}$) is greater than about 180 degrees, when the back face 914 of the slinger 910 contacts the surface 369, it may be supported in a manner where risk of axial tilting of the slinger 910 is diminished (e.g., in comparison to a small arc angle of, for example, about 10 degrees). Thus, a surface may include an arc angle sufficient to diminish flow with respect to gravity and sufficient to support a slinger.

As to the center housing 1150, it includes a profile where a minimum exists with respect to the "lip" portion. Such an arrangement may facilitate drainage of lubricant downwardly rather than over an edge to the surface 369 (see, e.g., FIG. 5). The center housing 1150 also shows a radius $R_{11}$.

FIG. 12 shows the enlarged cutaway views of the assembly 700 with arrows that indicate approximate directions of lubricant flow. As shown, the slinger 910 can receive lubricant ejected axially outwardly from a region between the outer race 332 and the inner race 334 (e.g., a gap) where the surface 916 of the slinger 910 may rotate during operation and throw (e.g., sling) the lubricant radially outwardly. For example, the slinger 910 may be fit via an interference fit to the shaft 320 such that rotation of the shaft 320 causes the slinger 910 to rotate. Due to the shape (e.g., a curved shape, sloped shape, etc.), during rotation of the slinger 910, a centripetal force may cause lubricant to be ejected radially outwardly, which may occur along the surface 916 or which may occur be departing the surface 916 (e.g., prior to reaching its outermost diameter).

As an example, lubricant may exist in a lubricant film region that exists in a radial clearance between the surface 381 of the through bore 380 of the center housing 350 and an outer surface of the outer race 332 of the bearing cartridge 330. For example, as shown in FIG. 7, the lubricant passages 373-1 and 373-2 may feed a film region and they may also feed one or more lubricant jets that direct lubricant to rolling elements of the bearing cartridge 330. To address lubricant emerging from the film region, the slinger 910 can include the surface 916 as extending to an outer diameter that is approximately equal to that of the outer race 332 (e.g., noting that the slinger 910 may be positioned in the center housing 350 via passage through the through bore 380). In such an example, as lubricant loses momentum (e.g., velocity), it may land in the annular groove 917, which is also in rotational motion. Upon landing, such lubricant may be slung radially outwardly away from the bore 357.

As to the center housing 1150, as shown, lubricant may flow along the surface 366 to the surface 367, which in this instance has a minimum radius that is not at an axial edge. Thus, the lubricant may flow azimuthally around the bore 357 with risk of flow over the edge being reduced (see, e.g., arrow with a cross therethrough). For example, some lubricant may flow clockwise along a groove and some lubricant may flow counter-clockwise in the groove, for example, where the groove is defined in part by a minimum radius that is not at an axial edge. As an example, a bore forming wall may include a portion that extends axially outwardly and that forms an annular channel for flow of lubricant. In such an example, the annular channel may span an arc angle less than about 360 degrees, for example, where an undercut may exist that may span an arc angle of about at least a few degrees. As an example, a housing may include multiple undercuts, for example, consider a housing with two undercuts where each of the undercuts provides a path for lubricant flow away from a turbine side bore.

Figure 13A:
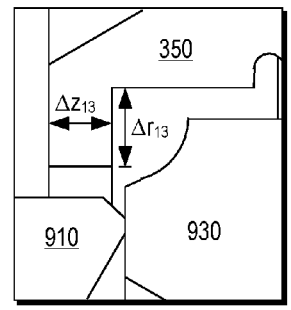
FIGS. 13A, 13B and 13C are a series of enlarged cutaway views of a turbine side bore assembly of the assembly of FIG. 7.
Figure 13B:
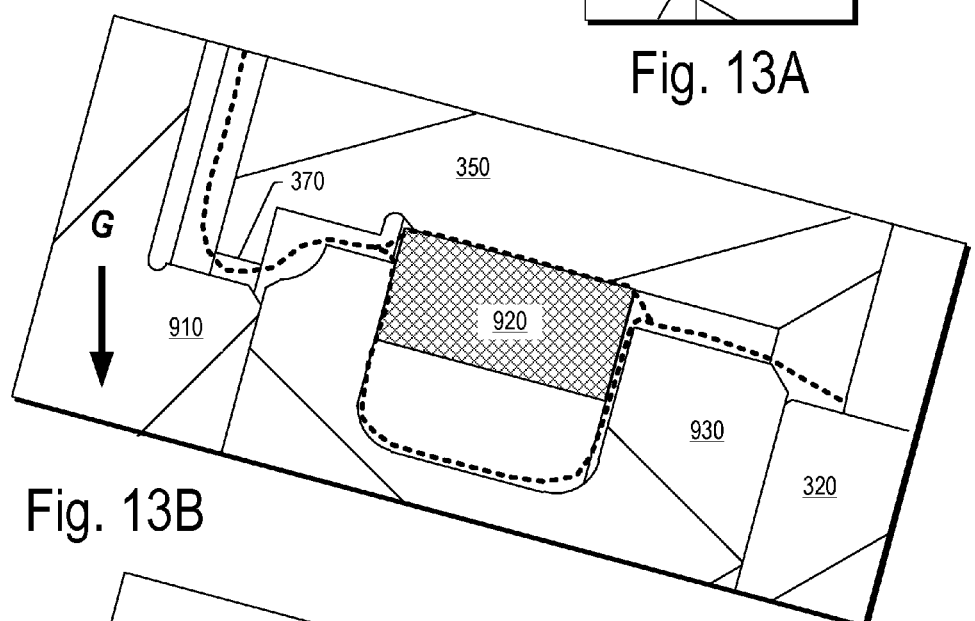
Figure 13C:
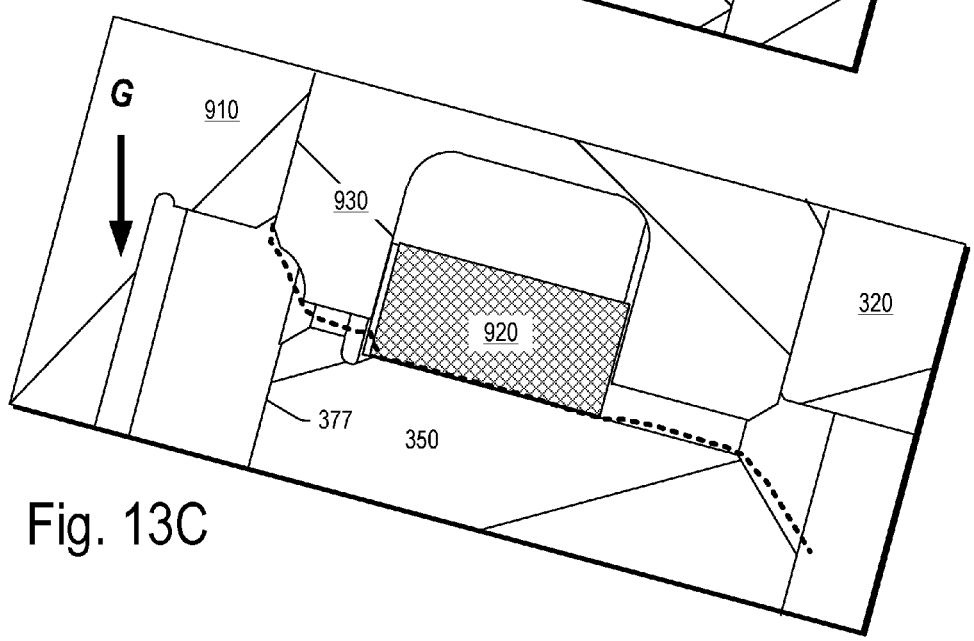

FIG. 13 shows enlarged cutaway views of a turbine side bore assembly of the assembly 700 of FIG. 7. As shown, labyrinths exist on both the upper and lower sides of the turbine side bore 357. Dotted lines indicate approximate flow paths for lubricant flow (e.g., undesirable flow paths or leakage paths) under the influence of gravity where the direction of gravity is indicated by an arrow (e.g., where the assembly 700 is set at an inclination angle with the turbine side down).

As an example, a physical labyrinth may form during operation of a turbocharger a labyrinth seal. A labyrinth seal configured with respect to a rotating shaft may provide for relatively non-contact sealing action and at least some control of passage of fluid. As an example, a labyrinth seal may employ centrifugal motion to diminish axial fluid flow. Centrifugal motion generated by a rotating component can force fluid radially outwardly, which, in turn, may lessen axial flow of fluid. As an example, fluid may become entrapped in a labyrinth chamber, where it may be forced into a vortex-like motion, which may act to diminish its escape.

As to the upper side, a portion of the surface 369 extends radially downwardly over an axial dimension (see, e.g., $\Delta r_{13}$ and $\Delta z_{13}$ of the inset of FIG. 13; see also, e.g., FIG. 4). As illustrated in FIG. 13, such a feature can act to increase tortuosity (e.g., complexity of a labyrinth seal). Or, in other words, the bore 357 may be recessed from a radius associated with the surface 369 such that the bore 357 has a radius that is greater than that of the surface 369. As an example, the surfaces 367 and 369 may form an overhang that overhangs an opening to the bore 357. Such an overhang may be defined in part by an axial dimension and an arc angle, for example, an arc angle that spans about 180 degrees or more about a bore 357 where the overhang overhangs a top side of the bore 357 and may end (see, e.g., the edge 359) prior to a bottom side of the bore 357. For lubricant to exit the center housing 350 of the assembly 700, it may need to follow one or more quite tortuous flow paths as indicated by the dotted lines.

As shown in FIG. 13, the seal element 920 (e.g., a piston ring, etc.) may be seated in a groove of the bushing 930, noting that the center housing 350 may include an annular groove and shoulder that can act to locate the seal element 920 (e.g., act as a contact to locate the seal element 920).

As to the lower side, where some amount of lubricant flows downward, for example, between and/or along the slinger 910 and the bushing 930, to exit the center housing 350, it may need to follow a tortuous flow path as indicated by the dotted line. As shown, the flow paths are asymmetric in that the upper path(s) are more tortuous than the lower path. As gravity may cause more lubricant to flow to the upper path (e.g., dripping, flowing, etc. downwardly), such an asymmetric approach may be considered and implemented, particularly where a center housing of a turbocharger is to be installed at a tilt angle other than horizontal. For example, as shown in FIG. 13, gravity may impart an "axial" acceleration (e.g., consider gravity as a vector with an axial component along the direction of a central axis of a through bore of a center housing). While gravity is directed earthwards, the influence of gravity may be considered with respect to a frame of reference that is associated with orientation of a turbocharger.

As an example, a turbocharger can include a center housing that includes a through bore; a bearing cartridge disposed in the through bore; a shaft and turbine wheel assembly rotatably supported by the bearing cartridge; and a slinger disposed axially between the bearing cartridge and the turbine wheel of the shaft and turbine wheel assembly. In such an example, the slinger can include an outer diameter, the bearing cartridge can include an outer diameter and the outer diameter of the slinger can be approximately equal to the outer diameter of the bearing cartridge.

As an example, a lubricant film clearance can exist between a bearing cartridge and a surface of a center housing that defines a through bore.

As an example, a bearing cartridge may include an inner race, an outer race and rolling elements disposed between the inner race and the outer race.

As an example, a turbocharger can include a bushing and a slinger that may form a sub-assembly, optionally together with one or more seal elements (e.g., consider a piston ring).

As an example, a center housing can include a turbine side bore formed in a turbine side wall of the center housing. In such an example, the center housing may include a turbine side bore overhang. As an example, such an overhang may be defined by an arc angle less than 360 degrees where, for example, the arc angle is greater than about 180 degrees. As an example, an overhang may include (e.g., be defined at least in part by) an axial dimension and a radial dimension.

As an example, a center housing can include a turbine side bore formed in a turbine side wall of the center housing. In such an example, the turbine side bore can include an undercut (see, e.g., the surface 368 of FIG. 5 that can form the undercut 377). As an example, an undercut may be defined at least in part by an arc angle, which may be less than 360 degrees and, for example, less than about 180 degrees.

As an example, a turbocharger can include a center housing that includes a turbine side wall that includes a turbine side bore where the turbine side bore includes an overhang portion and an undercut portion. In such an example, the overhang portion and the undercut portion may be defined by respective arc angles where the arc angles may sum to about 360 degrees.

As an example, a method can include operating a turbocharger; directing lubricant at least in part axially outwardly from a lubricant film disposed between an outer race of a bearing cartridge and a surface of a through bore of a center housing of the turbocharger; and directing at least a portion of the lubricant radially outwardly via a rotating slinger. In such a method, operating the turbocharger may include operating the turbocharger with a rotational axis disposed at a non-horizontal angle with a turbine side of the turbocharger down and a compressor side of the turbocharger up (e.g., with respect to gravity). In such an example, the angle may be an angle greater than about 5 degrees, an angle greater than about 10 degrees, an angle greater than about 15 degrees, or an angle greater than about 20 degrees.

As an example, a turbocharger can include a center housing that includes a through bore formed in part by a turbine side wall that includes a turbine side bore; a bearing cartridge disposed in the through bore; a shaft and turbine wheel assembly rotatably supported by the bearing cartridge; and a slinger disposed axially between the bearing cartridge and the turbine wheel of the shaft and turbine wheel assembly where the slinger includes an outer diameter that exceeds a diameter of the turbine side bore. In such an example, the slinger can include a front face that faces a turbine end of the bearing cartridge. In such an example, the bearing cartridge can include an inner race that, at the turbine end of the bearing cartridge, contacts the front face of the slinger. Such an arrangement may, for example, facilitate extraction of a shaft from the inner race of the cartridge where a back face of the slinger may bind against the turbine side wall.

As an example, a center housing for a turbocharger can include a through bore formed in part by a turbine side wall that includes a turbine side bore. In such an example, the turbine side bore may include an overhang. For example, an overhang may be defined by an arc angle less than 360 degrees (e.g., consider an arc angle of greater than about 180 degrees). As an example, an overhang may include an axial dimension and a radial dimension. As an example, an overhang may act to direct lubricant away from an opening of a turbine side bore.

As an example, a center housing for a turbocharger can include a through bore formed in part by a turbine side wall that includes a turbine side bore where the turbine side bore includes an undercut. In such an example, the undercut may be defined by an arc angle less than 360 degrees (e.g., consider an arc angle of less than about 180 degrees).

As an example, a center housing for a turbocharger can include a through bore formed in part by a turbine side wall that includes a turbine side bore where the turbine side bore includes an overhang portion and an undercut portion.

As an example, a turbocharger can include a center housing that includes a through bore; a bearing cartridge disposed in the through bore; a shaft and turbine wheel assembly rotatably supported by the bearing cartridge; and a bushing disposed axially between the bearing cartridge and the turbine wheel of the shaft and turbine wheel assembly where the bushing includes an annular groove to seat a seal element and where the bushing includes at least one lubricant slinger feature. As an example, consider the bushing 930 of FIG. 10 as including a slinger feature that may act to sling lubricant radially outwardly therefrom. As an example, consider an arrangement as illustrated in FIG. 13 where the bushing 930 extends axially away from the surface 368 of the turbine side wall 354 of the center housing 350. In such an example, the bushing 930 may include a feature (see, e.g., the feature 939 of the bushing 930 of FIG. 10) that can act to sling lubricant downwardly away from the turbine side bore 357.

As an example, a turbocharger assembly can include a shaft having a rotational axis where the shaft includes a turbine wheel that includes a hub portion; a bearing that includes an outer race, an inner race operatively coupled to the shaft, and rolling elements disposed between the inner race and the outer race where an inner radius of the outer race and an outer radius of the inner race define a radial gap; and a lubricant slinger disposed axially between the inner race and the hub portion of the turbine wheel where the lubricant slinger includes a surface that faces and slopes away from the radial gap. In such an example, the surface of the lubricant slinger can be or include an annular surface.

As an example, a surface of a lubricant slinger can include a slope defined between a first point at a first radius and a second point at a second, larger radius that exceeds the inner radius of the outer race. As an example, a surface of a lubricant slinger can be a curved surface (e.g., that faces a gap). As an example, a surface of a lubricant slinger can extend to a maximum radius of the lubricant slinger. As an example, a surface of a lubricant slinger can extend from a radius of an axially facing surface of the lubricant slinger.

As an example, a lubricant slinger can include an annular groove, which may be, for example, about an edge of the lubricant slinger. As an example, an annular groove of a lubricant slinger can include a minimum radius that exceeds an outer radius of an inner race of a rolling element bearing. As an example, an annular groove of a lubricant slinger can include a minimum radius that exceeds an inner radius of an outer race of a rolling element bearing.

As an example, a rolling element bearing and a lubricant slinger can form a substantially V-shaped annular lubricant passage. In such an example, the passage may be in fluid communication with a gap such as where an inner radius of an outer race and an outer radius of an inner race define a radial gap.

As an example, a lubricant slinger may be operatively coupled to a shaft. As an example, a lubricant slinger may be in contact with an inner race of a rolling element bearing and may be in contact with another component. In such an example, the lubricant slinger may be axially located by the inner race and the other component and, for example, rotate at the same speed as the inner race and the other component.

As an example, a turbocharger assembly can include a seal component disposed axially between a lubricant slinger and a hub portion of a turbine wheel. In such an example, the seal component can include an annular groove that receives a seal element (e.g., the turbocharger assembly can include the seal element). As an example, a seal component may include a plurality of annular grooves where at least one of the annular grooves receives at least one seal element (e.g., a piston ring, an O-ring, etc.).

As an example, a turbocharger assembly can include a bearing housing that includes a bore that receives at least a portion of a bearing (e.g., a rolling element bearing). In such an example, the bearing housing can include a turbine side bore and the assembly can include a seal component disposed axially between a lubricant slinger and a hub portion of a turbine wheel and at least partially within the turbine side bore.

As an example, a bearing housing can include a wall that defines a turbine side bore where the wall includes a first wall thickness that defines a first axial clearance with respect to a surface of the lubricant slinger and a second wall thickness that defines a second, greater axial clearance with respect to the surface of the lubricant slinger.

As an example, a turbocharger assembly can include a housing that includes a bearing bore that receives at least one rolling element bearing; and a turbine side bore that extends from an interior of the housing to an exterior of the housing and where the turbine side bore includes an interior side overhang. In such an example, the overhang can have an arc angle less than 360 degrees, which may be, for example, an arc angle of greater than about 180 degrees. As an example, an overhang can include an axial dimension and a radial dimension. As an example, a turbine side bore can include an overhang and an undercut.

As an example, a turbocharger assembly can include a housing that includes a bearing bore that receives at least one rolling element bearing; and a turbine side bore that extends from an interior of the housing to an exterior of the housing and where the turbine side bore includes an interior side undercut. In such an example, the undercut can have an arc angle less than 360 degrees, which may be, for example, an arc angle of less than about 180 degrees. As an example, a turbine side bore can include an interior side overhang and an interior side undercut. In such an example, the interior side overhang may have an arc angle greater than about 180 degrees and the interior side undercut may have an arc angle less than about 180 degrees. As an example, an interior side overhang and an interior side undercut may include respective arc angles that sum to about 360 degrees.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:
   a center housing that comprises a through bore;
   a shaft having a rotational axis wherein the shaft comprises a turbine wheel that comprises a hub portion;
   a bearing that comprises an outer race, an inner race operatively coupled to the shaft, and rolling elements disposed between the inner race and the outer race wherein an inner radius of the outer race and an outer radius of the inner race define a radial gap and wherein a radial clearance for a lubricant film exists between a surface of the through bore and an outer surface of the outer race; and
   a lubricant slinger disposed axially between the inner race and the hub portion of the turbine wheel wherein the lubricant slinger comprises a surface that faces and slopes away from the radial gap, wherein the lubricant slinger comprises a maximum radius that is less than a radius of the surface of the through bore and wherein the lubricant slinger comprises an annular groove that comprises a minimum radius that is greater than the inner radius of the outer race.

2. The turbocharger assembly of claim 1 wherein the surface of the lubricant slinger comprises an annular surface.

3. The turbocharger assembly of claim 1 wherein the surface of the lubricant slinger comprises a slope defined between a first point at a first radius and a second point at a second, larger radius that exceeds the inner radius of the outer race.

4. The turbocharger assembly of claim 1 wherein the surface of the lubricant slinger comprises a curved surface.

5. The turbocharger assembly of claim 1 wherein the surface of the lubricant slinger extends to a maximum radius of the lubricant slinger.

6. The turbocharger assembly of claim 1 wherein the surface of the lubricant slinger extends from a radius of an axially facing surface of the lubricant slinger.

7. The turbocharger assembly of claim 1 wherein the bearing and the lubricant slinger form a substantially V-shaped annular lubricant passage.

8. The turbocharger assembly of claim 1 wherein the lubricant slinger is operatively coupled to the shaft.

9. The turbocharger assembly of claim 1 further comprising a seal disposed axially between the lubricant slinger and the hub portion of the turbine wheel.

10. The assembly of claim 1 wherein the center housing comprises a turbine side bore and further comprising a seal disposed axially between the lubricant slinger and the hub portion of the turbine wheel and at least partially within the turbine side bore.

11. The turbocharger assembly of claim 1 wherein the center housing comprises a wall that defines a turbine side bore wherein the wall comprises a first wall thickness that defines a first axial clearance with respect) to a surface of the lubricant slinger and a second wall thickness that defines a second, greater axial clearance with respect to the surface of the lubricant slinger.

* * * * *